United States Patent
Lee et al.

(10) Patent No.: US 9,665,902 B2
(45) Date of Patent: May 30, 2017

(54) PERSONALIZED RECOMMENDATION METHOD AND SYSTEM, AND COMPUTER-READABLE RECORD MEDIUM

(71) Applicant: LG CNS CO., LTD., Seoul (KR)

(72) Inventors: Hwan Muk Lee, Seoul (KR); Dae Sik Lee, Seoul (KR); Byung Keug Kim, Seoul (KR); Soo Min Kim, Seoul (KR); Min Yong Park, Seoul (KR); Han Yi Song, Seoul (KR); Dong Yoon Lee, Seoul (KR); Yoon Jae Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 0 days.

(21) Appl. No.: 14/563,582

(22) Filed: Dec. 8, 2014

(65) Prior Publication Data

US 2016/0162973 A1    Jun. 9, 2016

(51) Int. Cl.
*G06Q 30/00* (2012.01)
*G06Q 30/06* (2012.01)
*G06Q 30/02* (2012.01)
*G06F 17/20* (2006.01)
(Continued)

(52) U.S. Cl.
CPC ......... *G06Q 30/0631* (2013.01); *G06F 15/16* (2013.01); *G06F 17/20* (2013.01); *G06Q 30/02* (2013.01); *G06Q 30/0201* (2013.01); *G06Q 30/0255* (2013.01); *G06Q 30/0282* (2013.01); *G06Q 30/06* (2013.01); *G06Q 30/0603* (2013.01); *G06F 7/00* (2013.01)

(58) Field of Classification Search
CPC ........... G06Q 30/0601–30/0643; G06Q 30/02; G06Q 30/0201; G06Q 30/0255; G06Q 30/0282; G06Q 30/06; G06F 7/00; G06F 15/16; G06F 17/20

USPC ............................................... 705/26.1–27.2
See application file for complete search history.

(56) References Cited

U.S. PATENT DOCUMENTS

| | | | |
|---|---|---|---|
| 2002/0161670 A1* | 10/2002 | Walker | G06Q 30/02 705/26.1 |
| 2010/0217725 A1* | 8/2010 | Clyne | G06Q 40/06 705/36 R |

(Continued)

OTHER PUBLICATIONS

Neff, Jack. Dawn of the Online Icebox: New Refrigerators Bring Food Marketers into Consumer Kitchens. Mar. 15, 1999 (Mar. 15, 1999). Accessed via ProQuest.*

*Primary Examiner* — Resha Desai
*Assistant Examiner* — Allison Wood
(74) *Attorney, Agent, or Firm* — KED & Associates, LLP

(57) ABSTRACT

Provided is a method, system, and a computer-readable recording medium for providing a personalized recommendation of products. The method may include extracting product recommendations corresponding to a prescribed recommendation time period using two or more purchase cycle algorithms, the purchase cycle algorithms configured to calculate purchase cycles of products for a customer. The method may further include performing performance evaluation, using a processor, with respect to the product recommendations extracted using each of the purchase cycle algorithms, and recommending to the customer the product recommendation extracted from the purchase cycle algorithm having a highest ranking based on the performance evaluation.

14 Claims, 4 Drawing Sheets

(51) Int. Cl.
*G06F 15/16* (2006.01)
*G06F 7/00* (2006.01)

(56) References Cited

U.S. PATENT DOCUMENTS

| | | | | |
|---|---|---|---|---|
| 2012/0254289 A1* | 10/2012 | Sathish | ............. | G06Q 30/0631 709/203 |
| 2014/0180793 A1* | 6/2014 | Boal | ................. | G06Q 30/0245 705/14.43 |
| 2014/0279208 A1* | 9/2014 | Nickitas | ............ | G06Q 30/0631 705/26.7 |

* cited by examiner

FIG. 2

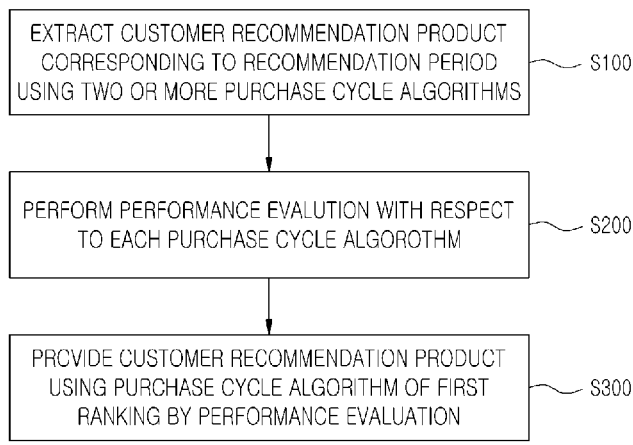

FIG. 3

LEARNING CUSTOMER RECOMMENDATION PRODUCT

| ALGORITHM | CUSTOMER NAME | PRODUCT NAME | EXPECTED PURCHASE DATE (YEAR-MONTH-DAY) |
|---|---|---|---|
| AVERAGE PURCHASE CYCLE ALGORITHM | C001 | Product A | 2014-02-11 |
| | | Product B | 2014-02-24 |
| | | Product C | 2014-02-07 |
| | | Product D | 2014-02-02 |
| | | Product W | 2014-07-13 |
| | | Product X | 2014-05-11 |
| | | Product Y | 2014-01-12 |
| | | Product Z | 2014-04-09 |

VERIFYING CUSTOMER RECOMMENDATION PRODUCT

| ALGORITHM | CUSTOMER NAME | PRODUCT NAME | EXPECTED PURCHASE DATE (YEAR-MONTH-DAY) |
|---|---|---|---|
| AVERAGE PURCHASE CYCLE ALGORITHM | C001 | Product A | 2014-05-23 |
| | | Product B | 2014-02-11 |
| | | Product C | 2014-03-18 |
| | | Product D | 2014-02-16 |
| | | Product W | 2014-06-07 |
| | | Product X | 2014-07-13 |
| | | Product Y | 2014-02-01 |
| | | Product Z | 2014-02-06 |

FIG. 4

| CUSTOMER NAME | PRODUCT NAME | LAST PURCHASE DATE (YEAR-MONTH-DAY) |
|---|---|---|
| P001 | Product A | 2014-01-25 |
| | Product B | 2013-11-11 |
| | Product C | 2014-01-25 |
| | Product D | 2014-01-29 |
| | Product E | 2014-02-28 |

(a)

| CUSTOMER NAME | PRODUCT NAME | AVERAGE PURCHASE CYCLE | EXPECTED PURCHASE DATE (YEAR-MONTH-DAY) |
|---|---|---|---|
| P001 | Product A | 118 | 2014-05-23 |
| | Product B | 141 | 2014-04-01 |
| | Product C | 52 | 2014-03-18 |
| | Product D | 31 | 2014-03-01 |
| | Product E | 135 | 2014-07-13 |

(b)

| CUSTOMER NAME | PRODUCT NAME | RECENT PURCHASE CYCLE | EXPECTED PURCHASE DATE (YEAR-MONTH-DAY) |
|---|---|---|---|
| P001 | Product A | 176 | 2014-07-20 |
| | Product B | 81 | 2014-01-31 |
| | Product C | 75 | 2014-04-10 |
| | Product D | 36 | 2014-03-06 |
| | Product E | 38 | 2014-04-07 |

(c)

| CUSTOMER NAME | PRODUCT NAME | CAPACITY PURCHASE CYCLE | EXPECTED PURCHASE DATE (YEAR-MONTH-DAY) |
|---|---|---|---|
| P001 | Product A | 135 | 2014-06-09 |
| | Product B | 135 | 2014-03-26 |
| | Product C | 40 | 2014-03-06 |
| | Product D | 57 | 2014-03-27 |
| | Product E | 160 | 2014-08-07 |

(c)

| CUSTOMER NAME | PRODUCT NAME | MINIMUM PURCHASE CYCLE | EXPECTED PURCHASE DATE (YEAR-MONTH-DAY) |
|---|---|---|---|
| P001 | Product A | 118 | 2014-05-23 |
| | Product B | 81 | 2014-01-31 |
| | Product C | 40 | 2014-03-06 |
| | Product D | 31 | 2014-03-01 |
| | Product E | 38 | 2014-04-07 |

(e)

| CUSTOMER NAME | PRODUCT NAME | STANDARD DEVIATION PURCHASE CYCLE | EXPECTED PURCHASE DATE (YEAR-MONTH-DAY) | EXPECTED PURCHASE DATE (YEAR-MONTH-DAY) |
|---|---|---|---|---|
| P001 | Product A | 74 | 2014-03-10 | 2014-08-05 |
| | Product B | 84 | 2014-01-07 | 2014-06-24 |
| | Product C | 33 | 2014-02-13 | 2014-04-20 |
| | Product D | 8 | 2014-02-21 | 2014-03-09 |
| | Product E | 98 | 2014-04-06 | 2014-10-19 |

| ALGORITHM | PERFORMANCE EVALUATION RESULT (PRIORITY) |
|---|---|
| MINIMUM PURCHASE CYCLE ALGORITHM | 1 |
| AVERAGE PURCHASE CYCLE ALGORITHM | 2 |
| STANDARD DEVIATION PURCHASE CYCLE ALGORITHM | 3 |
| CAPACITY PURCHASE CYCLE ALGORITHM | 4 |
| RECENT PURCHASE CYCLE ALGORITHM | 5 |

(a)

| CUSTOMER NAME | PRODUCT NAME | MINIMUM PURCHASE CYCLE | EXPECTED PURCHASE DATE (YEAR-MONTH-DAY) |
|---|---|---|---|
| P001 | Product C | 40 | 2014-03-06 |
| | Product D | 31 | 2014-03-01 |

(b)

PERSONALIZED RECOMMENDATION METHOD AND SYSTEM, AND COMPUTER-READABLE RECORD MEDIUM

BACKGROUND

1. Field

The present disclosure relates to a personalized recommendation method and system, and a computer-readable record medium, and more particularly, to a personalized recommendation method and system, and a computer-readable record medium capable of providing customer recommendation products using an analysis of a purchase cycle for each customer.

2. Background

A product recommendation service is widely being used as a main marketing means in the field of e-commerce.

Generally, when a customer visits an on-line market which is in an Internet or a mobile portal site, the on-line market recommends products in the form of a pop-up on a main window to the customer, or when the customer clicks specific products, the on-line market recommends related products to the customer. At this time, the recommended products may mostly be the most popular products, etc. in the on-line market. However, since such a product recommendation method recommends products en bloc to every customer without considering preference of each customer, there is a problem in that purchase effect of the recommended products is lowered.

Accordingly, the on-line market may provide a product recommendation service of recommending products in which a corresponding customer is likely to prefer by analyzing purchase behavior of the customer.

For example, products such as commodities, cosmetics, ingredients, etc. have a repeated and periodical purchase pattern. As such, a purchase cycle is an important factor for recommending products suitable for the customer.

The product recommendation service using the purchase cycle recommends products corresponding to the purchase cycle to the customer after calculating an average purchase cycle. However, when recommending the products using the average purchase cycle, there is a problem in which accuracy is lowered according to the product.

For example, when recommending an ice cream having a short purchase cycle in summer using the average purchase cycle, there is a problem of recommending the ice cream using the same purchase cycle even in winter having a long purchase cycle.

As such, when recommending the products using the average purchase cycle, there is a problem of recommending a corresponding product even when the customer does not need the corresponding product.

Meanwhile, the product recommendation service previously sets the purchase cycle of the corresponding product, and recommends the corresponding product every purchase cycle to the customer who purchased the corresponding product. However, in this case, since different purchase cycles between customers are not considered, there is a problem in which a purchase rate of recommendation product is lowered.

For example, when purchasing a sunblock, a first customer may purchase it every three months, a second customer may purchase it every six months, and a third customer may purchase it every year, but when setting the purchase cycle of the sunblock as the six-month cycle, there is a problem of recommending the sunblock every six-month cycle. Accordingly, there is a problem in which product recommendation for each customer cannot be precisely performed.

BRIEF DESCRIPTION OF THE DRAWINGS

The embodiments will be described in detail with reference to the following drawings in which like reference numerals refer to like elements wherein:

FIG. 2 is a flowchart for describing a personalized recommendation method according to an exemplary embodiment of the present disclosure;

FIG. 3 is a set of tables showing performance evaluation with respect to an average purchase cycle algorithm according to an exemplary embodiment of the present disclosure;

FIG. 4 is a list showing an expected purchase date calculated using each purchase cycle algorithm according to an exemplary embodiment of the present disclosure; and FIG. 5 is a customer recommendation product list according to an exemplary embodiment of the present disclosure.

DETAILED DESCRIPTION

Figure 1:
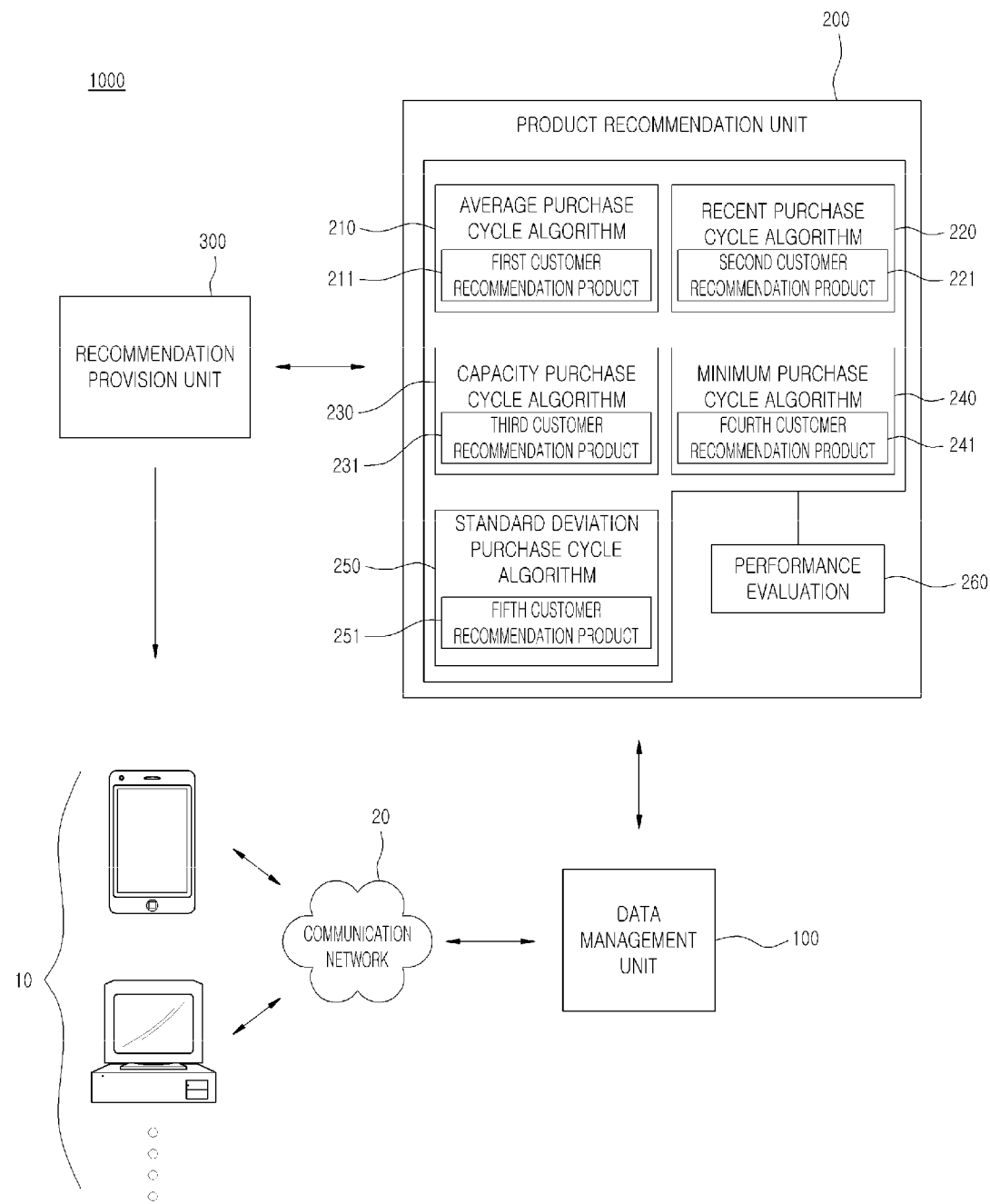
FIG. 1 is a schematic diagram illustrating a personalized recommendation system according to an exemplary embodiment of the present disclosure.

Exemplary embodiments of the present disclosure will be described in detail below with reference to the accompanying drawings. Exemplary embodiments will be described in sufficient detail to enable those of ordinary skill in the art to embody and practice the inventive concept. Exemplary embodiments are different, but it should be understood that they do not need to be mutually exclusive. For example, a particular shape, structure, characteristic set forth herein may be embodied in many alternate forms included in the spirit and the scope of the inventive concept. Further, it should be understood that a position and arrangement of each component, or element included in each embodiment may also be embodied in many alternative forms included in the spirit and the scope of the inventive concept. Accordingly, detailed descriptions which will be described hereinafter is not to be construed as limiting thereof, but all such modifications are intended to be included within the scope of the inventive concept as defined in the claims. When giving reference numerals to components of each drawing, it should be noted that the same or similar reference numeral is given to the same or similar component or function in many ways.

Hereinafter, exemplary embodiments of the present disclosure will be described in detail with reference to the accompanying drawings to enable those of ordinary skill in the art to embody and practice the inventive concept.

FIG. 1 is a schematic diagram illustrating a personalized recommendation system according to an exemplary embodiment of the present disclosure. A personalized recommendation system 1000 may include a data management unit 100, a product recommendation unit 200, and a recommendation provision unit 300.

The data management unit 100 may be connected to a plurality of terminals 10 through a communication network 20. Here, the plurality of terminals 10 may be terminals capable of transmitting and receiving various data through the communication network 20 according to a user's operation, and may be at least one of a tablet personal computer (PC), a laptop computer, a PC, a smart phone, a personal digital assistant (PDA), a smart television (TV), a mobile communication terminal, or the like. Further, the terminal 10 may be a terminal for performing voice or data communication using the communication network 20, and may be a terminal including a memory for storing a browser, a program, and a protocol for communicating with the data management unit 100 through the communication network 20, and a microprocessor for executing various programs and performing calculation and control, etc. That is, the terminal 10 may be any terminal capable of performing server-client communication with the data management unit 100 and executing a broadcasting service, and may mean a broad concept including a communication computing device such as a notebook computer, a mobile communication terminal, a PDA, etc. Meanwhile, the terminal 10 may be preferably manufactured as a device having a touch screen, but is not limited thereto.

The plurality of terminals 10 and the data management unit 100 may be connected through the communication network 20, and the communication network 20 may be a network capable of transmitting and receiving data according to an Internet protocol using various wired or wireless communication technologies such as an Internet network, an Intranet network, a mobile communication network, a satellite communication network, or the like.

Further, the communication network 20 may be connected to the data management unit 100, and store a computing resource such as hardware, software, etc. The communication network 20 may include a closed network such as a local area network (LAN), a wide area network (WAN), etc., and a open network such as the Internet, and also may mean a broad concept including a network such as code division multiple access (CDMA), wideband code division multiple access (WCDMA), global system for mobile communications (GSM), long term evolution (LTE), evolved packet core (EPC), etc., a next generation network which will be implemented henceforth, and a computing network.

The data management unit 100 may store purchase information of a plurality of customers through the communication network 20. For example, the data management unit 100 may be a server of an on-line market. The data management unit 100 may store various data such as product information related to products which customers have purchased in the on-line market. When the server of the on-line market is used as the data management unit 100, the data management unit 100 may store original data such as basic information, a purchase product, a purchase pattern, a purchase location, a purchase amount, or another appropriate type of information associated with a customer. As such, the data management unit 100 may be a storage area for storing the original data for providing customer recommendation products.

Meanwhile, the product recommendation unit 200 may provide customer recommendation products (or recommended products) having a high hit rate to the customer using data transmitted from the data management unit 100. At this time, the product recommendation unit 200 may select the customer recommendation products after selectively collecting only desired data from the data management unit 100. That is, the product recommendation unit 200 may not analyze all data stored in the data management unit 100, but may analyze only selected data by the selective collection. Accordingly, an amount of time required for selecting the customer recommendation products may be reduced by reducing the amount of unnecessary data.

For example, the product recommendation unit 200 may receive the purchase information of the customer with respect to each category. That is, only a category of products to be recommended to the customer among various categories such as groceries, furniture, digital devices, home appliances, computers, or the like may be selectively provided.

A distributed processing system for effectively managing big data may be applied to the product recommendation unit 200. The distributed processing system may be a system in which a plurality of processors operate to assist each other in parallel and asynchronously to improve processing capacity or efficiency, may not perform an operation of intensively processing every data in one processor, and may perform an operation of dispersively processing data in the plurality of processors.

As such, the product recommendation unit 200 may include two or more purchase cycle algorithms, and may provide customer recommendation products having a high hit rate to the customer. A method of providing the customer recommendation product using the two or more purchase cycle algorithms will be described in detail hereinafter.

Meanwhile, the recommendation provision unit 300 may provide the customer recommendation products selected by the product recommendation unit 200 to the customer. The recommendation provision unit 300 may be a display unit for visually displaying on a screen, and may be a speaker, etc. for outputting an audible sound. That is, the recommendation provision unit 300 may include various types of devices to present the customer recommendation products to the customer.

The recommendation provision unit 300 may provide the customer recommendation products in the form of a list, or a graph, etc., and may provide the customer recommendation product in various forms. The recommendation provision unit 300 may provide for the customers connected to the on-line market, or may provide the customer recommendation products to the terminal 10 of the customer based on an expected purchase time of the customer regardless of the connection to the on-line market.

The product recommendation unit 200 may analyze a purchase pattern of each product with respect to each customer, and select the customer recommendation products which are expected to be purchased within a recommendation period.

The product recommendation unit 200 may calculate the expected purchase time of a predetermined product by analyzing the purchase cycle with respect to a predetermined product, and provide the customer recommendation products to the customer based on the expected purchase time of the predetermined product. Here, the predetermined product is not limited to a specific product such as electronic products, clothes, groceries, etc, and may be various products.

As such, the product recommendation unit 200 may provide the customer recommendation products which are expected to be purchased within the recommendation period to each customer using data provided from the data management unit 100. That is, the product recommendation unit 200 may calculate the purchase cycle of each of predetermined products for each customer, and recommend the products which are expected to be purchased within the recommendation period.

FIG. 2 is a flowchart of a personalized recommendation method according to an exemplary embodiment of the present disclosure, and FIG. 3 is a set of tables illustrating performance evaluation with respect to an average purchase cycle algorithm according to an exemplary embodiment of the present disclosure.

Referring to FIGS. 2 and 3, according to the personalized recommendation method, first, an administrator may set the recommendation period. At this time, the recommendation period may be a specific date, a specific month or another appropriate time or time period based on the product. Further, the recommendation period may be set as a predetermined period, and be set in various ways.

Next, the customer recommendation products corresponding to the recommendation period may be extracted using the two or more purchase cycle algorithms that calculate the purchase cycle of each of predetermined products with respect to each customer, in step S100.

Here, the purchase cycle algorithms of extracting the customer recommendation products may be an average purchase cycle algorithm 210, a recent purchase cycle algorithm 220, a capacity purchase cycle algorithm 230, a minimum purchase cycle algorithm 240, a standard deviation purchase cycle algorithm 250, or other appropriate algorithms to calculate the purchase cycle may be further used.

First, the average purchase cycle algorithm 210 may calculate an average purchase cycle with respect to the predetermined product for each customer, and extract a first customer recommendation product 211 which is expected to be purchased within the recommendation time period.

For example, when there are a first purchase date, a second purchase date, . . . , an n-th purchase date, an n+1 purchase date, etc., an n-th purchase cycle may be a date obtained by subtracting the n-th purchase date from the n+1 purchase date. The method of calculating the purchase cycle may also be applied to various purchase cycle algorithms.

Here, the average purchase cycle algorithm 210 may calculate the average purchase cycle with respect to the predetermined product for each customer. As such, the average purchase cycle may be calculated by the following Equation:

$$\text{Average purchase cycle} = \{(\text{first purchase cycle} + \text{second purchase cycle} + \ldots + n\text{-th purchase cycle}) \div n\} \quad \text{Equation (1)}$$

The average purchase cycle algorithm 210 may calculate the average purchase cycle using data provided from the data management unit 100, and extract the customer recommendation products corresponding to the recommendation period from the average purchase cycle.

Specifically, the average purchase cycle algorithm 210 may execute an algorithm after classifying the data provided from the data management unit 100 as learning data and verifying data.

Here, the learning data and the verifying data may be classified by a data ratio or by a period, and may be classified in various ways. For example, when the learning data and the verifying data are classified by the data ratio, the learning data and the verifying data may be classified to have the data ratio of 8:2. Further, when the learning data and the verifying data are classified by the period, the learning data and the verifying data may be classified to have data during 10 months and data during 2 months, respectively, with respect to data during one year. The data ratio and the period of classifying the learning data and the verifying data are not limited to the method described above, and the learning data and the verifying data may be classified in various ways.

For example, when classifying the learning data and the verifying data, which are used in the average purchase cycle algorithm 210, the recent purchase cycle algorithm 220, the capacity purchase cycle algorithm 230, the minimum purchase cycle algorithm 240, the standard deviation purchase cycle algorithm 250, etc., by the period, the learning data may include all data, and the verifying data may include a portion of the data regarding products (e.g., only 20%) which are recently purchased among all data.

Here, a performance evaluation module 260 may extract the customer recommendation products for each customer corresponding to the recommendation period by applying the learning data and the verifying data to the average purchase cycle algorithm 210. That is, the performance evaluation 260 may apply the learning data to the average purchase cycle algorithm 210 and extract learning customer recommendation products, and apply the verifying data to the average purchase cycle algorithm 210 and extract verifying customer recommendation products. At this time, the learning customer recommendation products obtained using the average purchase cycle algorithm 210 may be the first customer recommendation product 211, in step S200.

As such, the performance evaluation 260 may calculate a hit rate using the learning customer recommendation products and the verifying customer recommendation products obtained using the average purchase cycle algorithm 210. The hit rate may be calculated by the following Equation:

$$\text{Hit rate (\%)} = [M1 \div \{N1 \times (P1+P2) \div 2\}] \times 100 \quad \text{Equation (2)}$$

where M1 is the number of products in which learning customer recommendation products and verifying customer recommendation products are matched, N1 is the number of customers, P1 is the number of learning customer recommendation products, and P2 is the number of verifying customer recommendation products.

Referring to FIG. 3, as an example when the recommendation period is set to February 2014, the learning customer recommendation products corresponding to the recommendation period obtained using the average purchase cycle algorithm 210 for a customer C001 may be products A, B, C, and D, and the verifying customer recommendation products corresponding to the recommendation period obtained using the average purchase cycle algorithm 210 for the customer C001 may be products B, D, Y, and Z. That is, the products in which the learning customer recommendation products and the verifying customer recommendation products are matched may be two products B and D. Here, "C001" may be a customer code for identifying each customer.

At this time, the expected purchase product for each customer may be extracted by setting and calculating the number of customers used in each purchase cycle algorithm as one person. The number of the learning customer recommendation products and the number of the verifying customer recommendation products may be set as the number of products corresponding to the recommendation period.

As such, when calculating the hit rate using the obtained values, the hit rate $(\%) = [2 \div \{1 \times (4+4) \div 2\}] \times 100$ may be 50% using the Equation (2).

The hit rate obtained by the performance evaluation module 260 with respect to the average purchase cycle algorithm 210 may be 50%. The first ranking or highest ranking purchase cycle algorithm may be selected by comparing the hit rate obtained by performance evaluation 260 of different purchase cycle algorithms.

That is, the product recommendation unit 200 may provide the customer recommendation product obtained using the purchase cycle algorithm of the first ranking to the customer after selecting the purchase cycle algorithm of the first ranking having the highest hit rate among the various purchase cycle algorithms.

Next, the recent purchase cycle algorithm 220 may calculate a recent purchase cycle, and extract a second customer recommendation product 221 which is expected to be purchased within the recommendation period. That is, the recent purchase cycle may be calculated using a last date of purchasing a predetermined product and a date of purchasing the predetermined product right before the last date.

For example, when there are a first purchase cycle, a second purchase cycle . . . , and an n-th purchase cycle, the n-th purchase cycle which is the last purchase cycle may be the recent purchase cycle.

The recent purchase cycle algorithm 220 may perform an algorithm after classifying data provided from the data management unit 100 as the learning data and the verifying data, like the average purchase cycle algorithm 210. Since a method of classifying the data provided from the data management unit 100 as the learning data and the verifying data was described above, detailed descriptions will be omitted.

As such, the performance evaluation 260 with respect to the recent purchase cycle algorithm 220 may be performed using the data classified as the learning data and the verifying data. That is, the performance evaluation 260 may apply each of the learning data and the verifying data to the recent purchase cycle algorithm 220, and extract the customer recommendation products for each customer corresponding to the recommendation period. At this time, the learning customer recommendation products obtained from the learning data using the recent purchase cycle algorithm 220 may be the second customer recommendation product 221.

The performance evaluation 260 may calculate a hit rate of the recent purchase cycle algorithm 220 by using Equation (2) for calculating the performance evaluation as described above.

Next, the capacity purchase cycle algorithm 230 may calculate a capacity purchase cycle according to a capacity of a predetermined product, and extract a third customer recommendation product 231 which is expected to be purchased within the recommendation period. The capacity of the predetermined product may be related to an amount or quantity of the product.

The capacity purchase cycle algorithm 230 may be obtained by the following Equation:

Capacity purchase cycle=[{(first purchase cycle+ second purchase cycle+ . . . +n-th purchase cycle)+total capacity of purchase product before n-th purchase cycle}×capacity of purchase product of last purchase date]   Equation (3)

The capacity purchase cycle algorithm 230 may perform an algorithm after classifying the data provided from the data management unit 100 as the learning data and the verifying data, like the average purchase cycle algorithm 210.

As such, the performance evaluation 260 with respect to the capacity purchase cycle algorithm 230 may be performed using the data classified as the learning data and the verifying data. That is, the performance evaluation 260 may apply the learning data and the verifying data to the capacity purchase cycle algorithm 230, and extract the customer recommendation products for each customer corresponding to the recommendation period. At this time, the learning customer recommendation products obtained from the learning data using the capacity purchase cycle algorithm 230 may be the third customer recommendation product 231.

The performance evaluation 260 may calculate a hit rate of the capacity purchase cycle algorithm 230 by using Equation (2) for calculating the performance evaluation.

Next, the minimum purchase cycle algorithm 240 may obtain the minimum purchase cycle by selecting the shortest purchase cycle among the average purchase cycle, the recent purchase cycle, and the capacity purchase cycle obtained using the average purchase cycle algorithm 210, the recent purchase cycle algorithm 220, and the capacity purchase cycle algorithm 230 with respect to the predetermined product, and extract a fourth customer recommendation product 241 which is expected to be purchased within the recommendation period.

For example, when the average purchase cycle, the recent purchase cycle, and the capacity purchase cycle obtained using the average purchase cycle algorithm 210, the recent purchase cycle algorithm 220, and the capacity purchase cycle algorithm 230 with respect to a product A of a customer C003 are 10, 8, and 9, respectively, the minimum purchase cycle algorithm 240 may select 8 which is the shortest purchase cycle. As such, the minimum purchase cycle algorithm 240 may select the shortest purchase cycle among the purchase cycles obtained using the average purchase cycle algorithm 210, the recent purchase cycle algorithm 220, and the capacity purchase cycle algorithm 230 with respect to various products of the customer. At this time, the purchase cycle selected using the minimum purchase cycle algorithm 240 is not limited to the purchase cycles obtained using the average purchase cycle algorithm 210, the recent purchase cycle algorithm 220, and the capacity purchase cycle algorithm 230, and may be the shortest purchase cycle selected when another algorithm is further added.

The minimum purchase cycle algorithm 240 may perform an algorithm by classifying the data provided from the data management unit 100 as the learning data and the verifying data, like the average purchase cycle algorithm 210.

As such, the performance evaluation 260 with respect to the minimum purchase cycle algorithm 240 may be performed using the data classified as the learning data and the verifying data. That is, the performance evaluation 260 may apply each of the learning data and the verifying data to the minimum purchase cycle algorithm 240, and extract the customer recommendation products for each customer corresponding to the recommendation period. At this time, the learning customer recommendation products obtained from the learning data using the minimum purchase cycle algorithm 240 may be the fourth customer recommendation product 241.

The performance evaluation module 260 may calculate a hit rate of the minimum purchase cycle algorithm 240 by the Equation for calculating the performance evaluation.

Next, the standard deviation purchase cycle algorithm 250 may apply a standard deviation to the average purchase cycle, and extract a fifth customer recommendation product 251 which is expected to be purchased within the recommendation period according to the calculated purchase cycle.

The standard deviation purchase cycle algorithm 250 may be obtained by Equation (4) below. A detailed example of obtaining the standard deviation purchase cycle will be described hereinafter.

Standard deviation purchase cycle=average purchase cycle±purchase cycle deviation   Equation (4)

The standard deviation purchase cycle algorithm 250 may perform an algorithm by classifying the data provided from the data management unit 100 as the learning data and the verifying data, like the average purchase cycle algorithm 210.

As such, the performance evaluation 260 with respect to the standard deviation purchase cycle algorithm 250 may be performed using the data classified as the learning data and the verifying data. That is, the performance evaluation 260 may apply each of the learning data and the verifying data to the standard deviation purchase cycle algorithm 250, and extract the customer recommendation products for each customer corresponding to the recommendation period. At this time, the learning customer recommendation products obtained from the learning data using the standard deviation purchase cycle algorithm 250 may be the fifth customer recommendation product 251.

The performance evaluation module 260 may calculate a hit rate of the standard deviation purchase cycle algorithm 250 by using Equation (2) for calculating the performance evaluation.

A method of calculating an expected purchase date using each of the purchase cycle algorithms will be described with reference to Tables 1 and 2. Table 1 shows a purchase date of a customer, and Table 2 shows an expected purchase date calculated using the purchase cycle algorithm.

TABLE 1

| Customer Name | Product Name | First Purchase Date (Capacity) | Second Purchase Date (Capacity) | Third Purchase Date (Capacity) |
|---|---|---|---|---|
| D0005 | Product A | 2013 Apr. 21 (92) | 2013 Aug. 4 (74) | 2013 Nov. 24 (84) |

TABLE 2

| Customer Name | Product Name | Average Purchase Cycle | Recent Purchase Cycle | Capacity Purchase Cycle | Minimum Purchase Cycle | Standard Deviation Purchase Cycle | |
|---|---|---|---|---|---|---|---|
| D0005 | Product A | 109 days (108.5) | 112 days | 110 days (109.8) | 109 days | 104 days | 114 days |
| Expected Purchase Date (Year-Month-Day) | | 2014 Mar. 13 | 2014 Mar. 16 | 2014 Mar. 14 | 2014 Mar. 13 | 2014 Mar. 8 | 2014 Mar. 18 |

Referring to Table 1, a customer D005 bought the product A three times.

First, a purchase cycle has to be obtained to calculate an average purchase cycle using the average purchase cycle algorithm 210. That is, the first purchase cycle may be a value obtained by subtracting the first purchase date from the second purchase date, and the first purchase cycle may be 105 days. The second purchase cycle may be a value obtained by subtracting the second purchase date from the third purchase date, and the second purchase cycle may be 112 days.

The average purchase cycle algorithm 210 may calculate the average purchase cycle which is 108.5 days based on Equation (1) for calculating the average purchase cycle described above. That is, the average purchase cycle=(105+112)÷2 may be obtained by Equation (1). At this time, when the average purchase cycle is 108.5 days, the administrator may set to raise a value below a decimal point, round off to the nearest integer, or neglect below the decimal point. In Table 2, when there is a decimal point in the calculated purchase date, the calculated purchase date may be adjusted to round off to the nearest integer.

Accordingly, the average purchase cycle algorithm 210 may extract the expected purchase date which is Mar. 13, 2014 by adjusting the average purchase cycle calculated as 108.5 days.

Next, the recent purchase cycle algorithm 220 may calculate the recent purchase cycle of 112 days which is the second purchase cycle, and extract the expected purchase date which is Mar. 16, 2014.

Next, the capacity purchase cycle algorithm 230 may calculate the capacity purchase cycle of 109.8 days based on Equation (3) for calculating the capacity purchase cycle described above. That is, the capacity purchase cycle={(105+112)÷(92+74)}×84 may be obtained by Equation (3). At this time, when the capacity purchase cycle is 109.8 days, the expected purchase date which is Mar. 14, 2014 may be extracted by adjusting as 110 days by rounding off to the nearest integer.

Next, the minimum purchase cycle algorithm 240 may obtain the minimum purchase cycle of 109 days which is the shortest purchase cycle among the average purchase cycle, the recent purchase cycle, and the capacity purchase cycle. The expected purchase date may be extracted as Mar. 13, 2014.

Next, the standard deviation purchase cycle algorithm 250 may apply the purchase cycle deviation to the average purchase cycle, and calculate the expected purchase date of the product. At this time, the purchase cycle deviation may be obtained by the square root of variance. That is, the variance may be obtained by the Equation of (sum of the squares of deviations)÷(the number of variables−1). At this time, the deviation may be a value obtained by subtracting the average purchase cycle from each purchase cycle. In other words, the deviation in Table 2 may be classified as a first deviation which is −3.5 days obtained by subtracting 108.5 days from 105 days, and a second deviation which is 3.5 days obtained by subtracting 108.5 days from 112 days.

As such, the variance=$\{(-3.5)^2+(3.5)^2\}÷(2-1)$ may be obtained as 24.5 days, and the purchase cycle deviation of 4.95 days which is the square root of the calculated variance may be obtained. Here, the purchase cycle deviation of 4.95 days may be adjusted as ±5 days, and the expected purchase date of the product may be extracted to be between Mar. 8, 2014 and Mar. 18, 2014.

FIG. 4 is a list showing an expected purchase date calculated by each purchase cycle algorithm according to an exemplary embodiment of the present disclosure, and FIG. 5 is a customer recommendation product list according to an exemplary embodiment of the present disclosure.

In FIG. 4 (a) is a list showing a purchase date of each product which a customer P001 purchased, and (b) to (f) of FIG. 4 are lists of an expected purchase date extracted after calculating a purchase cycle from each purchase cycle algorithm. At this time, the administrator may set the recommendation period as March, 2014, and a product extracted using each purchase cycle algorithm corresponding to the recommendation period may be the customer recommendation products.

For example, FIG. 4 (b), it may be known that products C and D corresponding to March 2014 which is the recommendation period using the average purchase cycle algorithm 210 are extracted as the first customer recommendation product 211.

Referring to FIG. 4 (*c*), it may be known that the product D corresponding to March, 2014 which is the recommendation period using the recent purchase cycle algorithm 220 is extracted as the second customer recommendation product 221.

As such, each purchase cycle algorithm may extract the customer recommendation products corresponding to the recommendation period.

FIG. 5 (*a*) is a list showing a priority according to the performance evaluation, FIG. 5 (*b*) is a list showing the customer recommendation products of a purchase cycle algorithm corresponding to a first ranking.

That is, the fourth customer recommendation product 241 of the minimum purchase cycle algorithm 240 corresponding to the first ranking may be determined as the customer recommendation product by the performance evaluation of each purchase cycle algorithm as shown in FIG. 5 (*a*). Accordingly, the product recommendation unit 200 may recommend the products C and D to the customer P001 in March 2014, in step S300.

Meanwhile, both the product having the first ranking and a product of a second ranking by the performance evaluation 260 of each purchase cycle algorithm may be recommended to the customer as the customer recommendation products, and the number of the selected purchase cycle algorithms may be adjusted by the administrator. In this case, when the customer recommendation products are duplicated, some of the duplicated customer recommendation products may be eliminated and the rest may be recommended to the customer.

Accordingly, the personalized recommendation method can provide the customer recommendation products having a high hit rate by the performance evaluation 260 of each purchase cycle algorithm to the customer.

Exemplary embodiments described above may be recorded in a computer-readable record medium by being implemented in the form of program instructions which is executable using various computer components. The computer-readable record medium may include program instructions, data files, data structures, etc., alone or in combination. The program instructions recorded in the computer-readable record medium may be specially designed for the present disclosure, or may be known to those skilled in the art of the computer software field. Examples of the computer-readable record medium may include a hardware device, which is specially configured to store and execute the program instructions, such as a hard disk, a floppy disk, a magnetic medium such as a magnetic tape, an optical storage medium such as a compact disk-read only memory (CD-ROM) and a digital video disc (DVD), a magneto-optical media such as a floptical disk, a ROM, a random access memory (RAM), a flash memory, etc. Examples of the program instructions may include mechanical codes which are made by a compiler, and high-level language codes which are executable by a computer using an interpreter, etc. The hardware device may be configured to operate as one or more software modules to perform the method according to the present disclosure, and vice versa.

The method of selecting the customer recommendation products according to the personalized recommendation method may be only preferred exemplary embodiments, and it will be apparent to those skilled in the art that various modifications can be made to the above-described exemplary embodiments of the present disclosure without departing from the spirit or scope of the disclosure. The above-described exemplary embodiments of the present disclosure should be understood to be illustrative and not to limit in all respects. For example, each component described as a single type may be implemented as a distributed type, and similarly, components described as a distributed type may be implemented as a combined type.

Effects of the personalized recommendation method and system, and the computer-readable recording medium described above will be described below.

According to the present disclosure, the purchase cycle for each customer may be calculated using two or more purchase cycle algorithms, and the expected purchase date may be calculated by the calculated purchase cycle. The customer recommendation products corresponding to the recommendation period may be extracted by each purchase cycle algorithm.

Next, the priority of each purchase cycle algorithm may be determined using the performance evaluation, and the customer recommendation product of the purchase cycle algorithm having the first ranking may be provided to the customer by the product recommendation unit.

The personalized recommendation method can increase the purchase rate of the recommendation product by providing the customer recommendation product.

As broadly disclosed and embodied herein, a personalized recommendation method and system, and a computer-readable record medium of recommending products by calculating a purchase cycle for each customer.

According to one aspect of the present disclosure, a personalized recommendation method may include extracting a customer recommendation product corresponding to a recommendation period using two or more purchase cycle algorithms of calculating a purchase cycle of each of predetermined products for each customer; performing performance evaluation with respect to each of the purchase cycle algorithms; and recommending the customer recommendation product extracted from the purchase cycle algorithm having a first ranking by the performance evaluation to a customer.

According to an embodiment, the purchase cycle algorithm may be an average purchase cycle algorithm of calculating an average purchase cycle of the predetermined product.

According to an embodiment, the purchase cycle algorithm may be a recent purchase cycle algorithm of calculating a last purchase cycle of the predetermined product.

According to an embodiment, the purchase cycle algorithm may be a capacity purchase cycle algorithm of calculating a capacity purchase cycle according to capacity of the predetermined product.

According to an embodiment, the purchase cycle algorithm may be a minimum purchase cycle algorithm of obtaining a minimum purchase cycle by selecting the shortest purchase cycle among the average purchase cycle, the recent purchase cycle, and the capacity purchase cycle of the predetermined product.

According to an embodiment, the purchase cycle algorithm may be a standard deviation purchase cycle algorithm of applying a purchase cycle deviation to the average purchase cycle, and calculating a standard deviation purchase cycle.

According to an embodiment, the average purchase cycle may be obtained by Equation of average purchase cycle={(first purchase cycle+second purchase cycle+ . . . +n-th purchase cycle)÷n}.

According to an embodiment, the capacity purchase cycle may be obtained by Equation of capacity purchase cycle= [{(first purchase cycle+second purchase cycle+ . . . +n-th purchase cycle)÷total capacity of purchase product before n-th purchase cycle}×capacity of purchase product of last purchase date].

According to an embodiment, the standard deviation purchase cycle may be obtained by Equation of standard deviation purchase cycle=average purchase cycle ±purchase cycle deviation, and the purchase cycle deviation may be obtained from the square root of variance.

According to an embodiment, the performing of the performance evaluation may include: applying learning data and verifying data to each of the purchase cycle algorithms and extracting a learning customer recommendation product and a verifying customer recommendation product corresponding to the recommendation period; and obtaining hit rates of the learning customer recommendation product and the verifying customer recommendation product by Equation hit rate (%)=[$M1 \div \{N1 \times (P1+P2) \div 2\}$]×100.

According to an embodiment, the learning data and the verifying data may be classified by a data ratio or a period.

According to another aspect of the present disclosure, there is provided a personalized recommendation system, including: a data management unit configured to store purchase history information of a customer; a product recommendation unit configured to determine a customer recommendation product using data provided from the data management unit; and a recommendation provision unit configured to provide the customer recommendation product determined by the product recommendation unit to the customer.

According to an embodiment, the recommendation provision unit may provide the customer recommendation product to customers connected to the data management unit, or to a terminal of the customer regardless of connection to the data management unit.

According to an embodiment, the product recommendation unit may receive the purchase information of each category from the data management unit.

According to still another aspect of the present disclosure, there is provided a computer-readable record medium for recording a computer program for executing the personalized recommendation method.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A computer-implemented method of providing a personalized recommendation of products, comprising:

extracting product recommendations corresponding to a prescribed recommendation time period using a plurality of purchase cycle algorithms, the purchase cycle algorithms configured to calculate purchase cycles of products for a customer, wherein the purchase cycle is a prescribed period of time between each purchase of the same product;

performing a performance evaluation, using a processor, with respect to the product recommendations extracted using each of the purchase cycle algorithms, wherein performing the performance evaluation includes:

receiving a first data set of product purchase information and receiving a second data set of product purchase information, the second data set being a smaller data set than the first data set, applying the first data set and the second data set to each of the purchase cycle algorithms and extracting a first product recommendation and a second product recommendation corresponding to the recommendation time period, and obtaining hit rates of the first product recommendation and the second product recommendation based on a prescribed equation, wherein hit rate (%)=[$M1 \div \{N1 \times (P1+P2) \div 2\}$]×100, and wherein M1 is a number of products in which the first product recommendation and the second product recommendation are matched, N1 is a number of customers, P1 is a number of first product recommendations, and P2 is a number of second product recommendations; and outputting, at a device of the customer, the product recommendation extracted from the purchase cycle algorithm having a highest ranking based on the performance evaluation, wherein the plurality of purchase cycle algorithms includes a capacity purchase cycle algorithm that calculates a capacity purchase cycle according to capacity of the products, the capacity purchase cycle being based on an amount that the customer purchases during each purchase cycle, and wherein the method is performed by a distributed processing system that includes a plurality of processors that operate in parallel and asynchronously.

2. The computer-implemented method of claim 1, wherein the plurality of purchase cycle algorithms includes an average purchase cycle algorithm that calculates an average of periods of time between purchases of the same product.

3. The computer-implemented method of claim 2, wherein the plurality of purchase cycle algorithms includes a standard deviation purchase cycle algorithm that applies a purchase cycle deviation to the average purchase cycle and calculates a standard deviation for the periods of time.

4. The computer-implemented method of claim 3, wherein the standard deviation purchase cycle is obtained by a prescribed equation, wherein standard deviation purchase cycle=average purchase cycle±purchase cycle deviation, wherein the purchase cycle deviation is obtained from a square root of variance.

5. The computer-implemented method of claim 2, wherein the average purchase cycle is obtained by a prescribed equation, wherein $$\text{average purchase cycle} = \{(\text{first period of time} + \text{second period of time} + \ldots + n\text{-th period of time}) \div n\},$$

wherein the n-th period of time is a time between an n-th and a (n+1)-th purchase of the product.

6. The computer-implemented method of claim 1, wherein the plurality of purchase cycle algorithms includes a most recent purchase cycle algorithm that calculates a last purchase cycle of the products.

7. The computer-implemented method of claim 1, wherein the plurality of purchase cycle algorithms includes a minimum purchase cycle algorithm that obtains a minimum purchase cycle by selecting a shortest purchase cycle among the plurality of purchase cycle algorithms.

8. The computer-implemented method of claim 1, wherein the capacity purchase cycle is obtained by a prescribed equation, where $$\text{capacity purchase cycle} = [\{(\text{first period of time} + \text{second period of time} + \ldots + n\text{-th period of time}) + \text{total capacity of purchase product before n-th purchase cycle}\} \times \text{capacity of purchase product of last purchase date}].$$

9. The computer-implemented method of claim 1, wherein the first data set is a learning data and the second data set is a verifying data, wherein the learning data and the verifying data are classified by a ratio of an amount of data or a time period.

10. The method of claim 1, wherein extracting the product recommendations includes generating a list of products using the purchase cycle algorithms, and wherein the method further comprises:
ranking the purchase cycle algorithms with respect to the customer based on the performance evaluation;
generating an order list of products based on the ranking the purchase cycle algorithms; and
generating an output that includes at least a subset of the ordered lists of products, wherein the output is presented by the device of the customer.

11. A system for providing a personalized recommendation of products, comprising:
a data management server configured to store purchase history information of a customer;
a distributed processing system configured to determine the product recommendation for the customer using data provided from the data management server, wherein the distributed processing system includes a plurality of processors that operate in parallel and asynchronously; and
an output device configured to provide the product recommendation determined by the distributed processing system to the customer,
wherein the distributed processing system is further configured to:
extract product recommendations corresponding to a prescribed recommendation time period using a plurality of purchase cycle algorithms, the purchase cycle algorithms configured to calculate purchase cycles of products for a customer, wherein the purchase cycle is a prescribed period of time between each purchase of the same product;
perform a performance evaluation with respect to the product recommendations extracted using each of the purchase cycle algorithms, wherein the distributed processing system, when performing the performance evaluation, is further configured to:
determine a first data set of product purchase information and a second data set of product purchase information, the second data set being a smaller data set than the first data set,
apply the first data set and the second data set to each of the purchase cycle algorithms and extracting a first product recommendation and a second product recommendation corresponding to the recommendation time period, and
obtain hit rates of the first product recommendation and the second product recommendation based on a prescribed equation, wherein $$\text{hit rate}(\%) = [M1 \div \{N1 \times (P1 + P2) \div 2\}] \times 100, \text{ and}$$

wherein M1 is a number of products in which the first product recommendation and the second product recommendation are matched, N1 is a number of customers, P1 is a number of first product recommendations, and P2 is a number of second product recommendations; and
transfer, for output at the output device, the product recommendation extracted from the purchase cycle algorithm having a highest ranking based on the performance evaluation, and
wherein the plurality of purchase cycle algorithms includes a capacity purchase cycle algorithm that calculates a capacity purchase cycle according to capacity of the products, the capacity purchase cycle being based on an amount that the customer purchases during each purchase cycle.

12. The personalized recommendation system of claim 11, wherein the output device provides the product recommendation to customers connected to the data management server, or to a terminal of the customer based on the purchase cycles of products regardless of connection to the data management server.

13. The personalized recommendation system of claim 11, wherein the distributed processing system receives the purchase information of a plurality of categories of products from the data management server.

14. A non-transitory computer-readable record medium for recording a computer program for executing a method comprising:
extracting product recommendations corresponding to a prescribed recommendation time period using a plurality of purchase cycle algorithms, the purchase cycle algorithms configured to calculate purchase cycles of products for a customer, wherein the purchase cycle is a prescribed period of time between each purchase of the same product;
performing a performance evaluation with respect to the product recommendations extracted using each of the purchase cycle algorithms, wherein performing the performance evaluation includes
receiving a first data set of product purchase information and receiving a second data set of product purchase information, the second data set being a smaller data set than the first data set,
applying the first data set and the second data set to each of the purchase cycle algorithms and extracting a first product recommendation and a second product recommendation corresponding to the recommendation time period, and obtaining hit rates of the first product recommendation and the second product recommendation based on a prescribed equation, wherein hit rate (%)=$[M1 \div \{N1 \times (P1+P2) \div 2\}] \times 100$, and wherein M1 is a number of products in which the first product recommendation and the second product recommendation are matched, N1 is a number of customers, P1 is a number of first product recommendations, and P2 is a number of second product recommendations; and outputting, to a device of the customer, the product recommendation extracted from the purchase cycle algorithm having a highest ranking based on the performance evaluation, wherein the method is performed by a distributed processing system that includes a plurality of processors that operate in parallel and asynchronously.

\* \* \* \* \*